(12) United States Patent
Letzelter et al.

(10) Patent No.: US 9,875,555 B2
(45) Date of Patent: Jan. 23, 2018

(54) PARTITIONING AN IMAGE

(71) Applicant: DASSAULT SYSTEMES, Velizy Villacoublay (FR)

(72) Inventors: Frederic Letzelter, Longjumeau (FR); Amelie Renard, Issy-les-Moulineaux (FR); Laura Peythieux, Boulogne Billancourt (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 14/945,055

(22) Filed: Nov. 18, 2015

(65) Prior Publication Data

US 2016/0140723 A1 May 19, 2016

(30) Foreign Application Priority Data

Nov. 18, 2014 (EP) .................... 14306826

(51) Int. Cl.
| | | |
|---|---|---|
| *G06K 9/34* | (2006.01) | |
| *G06T 7/60* | (2017.01) | |
| *G06K 9/46* | (2006.01) | |
| *G06T 11/20* | (2006.01) | |
| *G06T 11/00* | (2006.01) | |
| *G06K 9/52* | (2006.01) | |
| *G06T 7/73* | (2017.01) | |
| *G06T 7/11* | (2017.01) | |
| *G06T 7/13* | (2017.01) | |
| *G06T 7/187* | (2017.01) | |

(52) U.S. Cl.
CPC .............. *G06T 7/60* (2013.01); *G06K 9/4604* (2013.01); *G06K 9/52* (2013.01); *G06T 7/11* (2017.01); *G06T 7/13* (2017.01); *G06T 7/187* (2017.01); *G06T 7/73* (2017.01); *G06T 11/001* (2013.01); *G06T 11/203* (2013.01); *G06K 2009/4666* (2013.01); *G06T 2207/10024* (2013.01); *G06T 2207/20021* (2013.01); *G06T 2207/20096* (2013.01)

(58) Field of Classification Search
CPC ............. G06T 7/11; G06T 2207/20112; G06T 11/203
See application file for complete search history.

(56) References Cited

U.S. PATENT DOCUMENTS

| 4,956,906 A | * | 9/1990 | Masse ..................... B41M 1/40 283/117 |
|---|---|---|---|
| 8,315,479 B1 | | 11/2012 | Gilra |
| 8,411,115 B1 | | 4/2013 | Musselman et al. |

(Continued)

OTHER PUBLICATIONS

Extended European Search Report dated Jul. 16, 2015 in European Application 14306826.0-1906 filed Nov. 18, 2014, 7 pages.

(Continued)

*Primary Examiner* — Eueng-Nan Yeh
(74) *Attorney, Agent, or Firm* — Oblon, McClelland, Maier & Neustadt, L.L.P.

(57) ABSTRACT

The invention is directed to a computer-implemented method for partitioning an image. The method comprises displaying an image that comprises a border; drawing a curve over the image; computing all closed areas delimited by the curve and the border of the image, each closed area being independent from the other computed closed areas and individually selectable.

15 Claims, 7 Drawing Sheets

(56) References Cited

U.S. PATENT DOCUMENTS

| | | | | |
|---|---|---|---|---|
| 2006/0227292 | A1* | 10/2006 | Lawrence | G03B 27/54 353/28 |
| 2007/0242794 | A1* | 10/2007 | Stanton | A61B 6/02 378/5 |
| 2013/0016112 | A1* | 1/2013 | Burley | G06T 15/04 345/582 |
| 2013/0159916 | A1* | 6/2013 | Wadayama | G06F 3/0483 715/776 |
| 2013/0177246 | A1* | 7/2013 | Stokes | G06K 9/00456 382/182 |

OTHER PUBLICATIONS

Anonymous: "Gsoc—Slicing Tool (2012)—GIMP Development—gimpusers.com", Apr. 2, 2012, XP055199769; Retrieved from the Internet: URL:http://www;gimpusers.com/forums/gimp-developer/14213-gsoc-slicing-tool [retrieved on Jul. 2, 2015], 9 pages.
G. Linda Shapiro, et al.; "Computer Vision—chapter 10 Image Segmentation"; Mar. 1, 2000, XP055199831; Retrieved from the Internet: URL:https://courses.cs.washington.edu/courses/cse576/book/ch10.pdf; [retrieved on Jul. 2, 2015]; 51 pages.

* cited by examiner

PARTITIONING AN IMAGE

CROSS-REFERENCE TO RELATED APPLICATIONS

This application claims priority under 35 U.S.C. §119 or 365 to European Application No. 14306826.0, filed Nov. 18, 2014. The entire contents of the above application(s) are incorporated herein by reference.

FIELD OF THE INVENTION

The invention relates to the field of computer programs and systems, and more specifically to a method, system and program for partitioning an image.

BACKGROUND

Most of drawing software used to deal with images provide the user with functions for extracting of a subpart of an image. Typically, the user has to perform the following operations when partitioning an image. First, he delimitates the boundary of the subpart he is looking for; he can either draw a free form or a primitive form (rectangle, circle . . . ). Then, based on user's drawing, the software tries to divide the image in two different parts: the first one placed inside the drawing, and the second one placed outside of it.

In the particular case of a free form drawn by the user, the software closes the drawing by linking the first point to the last one. This is necessary to be sure that the drawing defines an "inside" and an "outside" parts in the image. This is illustrated on FIGS. 1 and 2. In FIG. 1, the free from 10 drawn by the user is not closed as there is no connection between the start point of the free form and its end point. A link 20 is created by the software for obtaining a closed free form (which is a boundary), as illustrated on FIG. 2. By this way, the known method for partitioning the image is able to separate the image in two distinct areas: the first one is inside the boundary and the second one is outside the boundary. Then, after the user validation of the separation (sometimes it can be automatic), only the inner part is kept. This choice can sometimes be reversed to keep the outer part, but it is not always the case. The subpart of the image is just selected. To create another image from this selection, or remove it or anything else, the user has to do another action. For example to create another image with his selection the user has to create a new image and then do a copy paste, or invert his selection and remove the unwanted part.

The known solutions for partitioning an image contain several limitations. The first one is that the user can not always define precisely the sub part he wants. That is because either the software only allows him to use a primitive form (e.g. a rectangle) to specify the boundaries, either it links the first point to the last one to create a closed boundary, without taking into account the form of the drawing (if it already defines a closed curve for example). This leads to bad results, as illustrated on FIGS. 3 and 4. In FIG. 3, the user has drawn a free form on the image which is a closed free form. However, there is no connection between the start and end points of the closed free form so that the software creates a link between these two points, thus leading to the creation of a second closed area as illustrated on FIG. 4. Hence, the user's intention is not taking into account.

Another drawback is that the subpart which is kept by the software is always the inner one. In some programs, the user can do some operations to invert that and keep the outer part instead of the inner one but that is not always possible.

A further drawback is that the selection of several subparts is time consuming and tedious. This is illustrated in the following scenario wherein the user works on an image and wants to extract two different parts from it. With the existing software, he has to follow these steps: import the original image, define the first subpart by taking care of drawing a closed shape, copy/paste this part in a new image (or invert the selection and remove the unselected part), import the original image again, define the second subpart by taking care of drawing a closed shape, copy/paste this part in a new image (or invert the selection and remove the unselected part).

One more drawback is that if the user wants to simply cut an image in half, he will have to do a circle around the part he wants, as illustrated on FIGS. 5 and 6. This is not intuitive, time consuming, but also not ergonomic.

An additional drawback is that the choice of subparts can be unpredictable as the known solutions relies on the detection of the "inside" and the "outside" of the closed areas drawn by the user or of the primitive form. However, the identification of the "inside" and the "outside" of a free form can be a complicated task for the current algorithms; especially, when the free form comprises several intersections, the algorithm cannot be able to identify which parts of the free form are the inside and outside. Moreover, the detection of the "inside" and the "outside" of the closed areas is time consuming for the computer system because the detection is not straightforward for the current algorithms. Hence, a significant amount of computing resources are used for a result that can be unpredictable.

Within this context, there is still a need for an improved method for partitioning an image into one or more selectable subparts.

SUMMARY OF THE INVENTION

It is therefore provided a computer-implemented method for partitioning an image. The computer-implemented method comprises the steps of:
  displaying an image that comprises a border;
  drawing a curve over the image;
  computing all closed areas delimited by the curve and the border of the image, each closed area being independent from the other computed closed areas and individually selectable.

The computer-implemented method may further comprise:
  after the step of drawing the curve over the image, the steps of building (S40) a continuous polyline from the curve drawn over the image; for each line forming the continuous polyline, identifying pixels of the displayed image that have the said each line as an edge;
  the step of building the continuous polyline comprises: computing a set of pixels linking two distinct end points of the curve drawn over the image, wherein neighboring pixels of the set have an edge in common; building a continuous polyline wherein each line of the polyline is an edge of one of the pixels of the computed set of pixel;
  after the step of identifying the pixels of the displayed image, a step of marking each identified pixel, the marking indicating the position of polyline relative to the said each identified pixel;
  the step of marking each identified pixel is performed by coloring each identified pixel with a color encoded with a RGBA color space: a first RGBA value indicates a polyline positioned on the right side of the pixel; a second RGBA value indicates a polyline positioned on the left side of the pixel; a third RGBA value indicates a polyline positioned on the up side of the pixel; a fourth RGBA value indicates a polyline positioned on the bottom side of the pixel;

the coloring of each pixel is cumulative;

the step of computing all closed areas delimited by the curve and the border of the image is performed by using a region growing algorithm wherein a region membership criterion of a pixel is not to be across the continuous polyline;

the region growing algorithm comprises the steps of: (i) selecting a first pixel of the image that belongs to a first closed areas; (ii) identifying neighboring pixels of the selected first pixel that meet the criterion by using the marking on the selected pixel; (iii) adding each neighboring pixel identified at step (ii) in a list of pixels to be selected and treated as the first selected pixel; (iv) marking the selected first pixel as checked and adding the selected first pixel to a list of pixel belonging to the first closed areas; (v) selecting a second pixel in the list of pixels to be selected and performing the steps (ii) to (iv) for the second pixel; (vi) repeating the step (v) until all the pixels of the list of pixels to be selected have been selected;

(vii) identifying a third pixel of the image that belongs to a second closed area, the third pixel were not marked at step (iv); (viii) performing the steps (ii) to (vi); (ix) repeating the steps (vii) to (viii) until all the pixels of the image are marked as checked;

the steps performed starting from the step of building a continuous polyline are carried out on a mask, wherein the mask is an image with the same size and the same number of pixels as the displayed image;

the mask is initialized as a blank image and the pixels marked as checked are colored in black when added to a list of pixel belonging to a closed areas;

the computed closed areas are stored in a quadtree data structure;

after the step of computing all closed areas, the steps of: selecting individually at least one closed area; creating an independent image for each closed area selected.

It is further provided a computer program comprising instructions for performing the above method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 7:
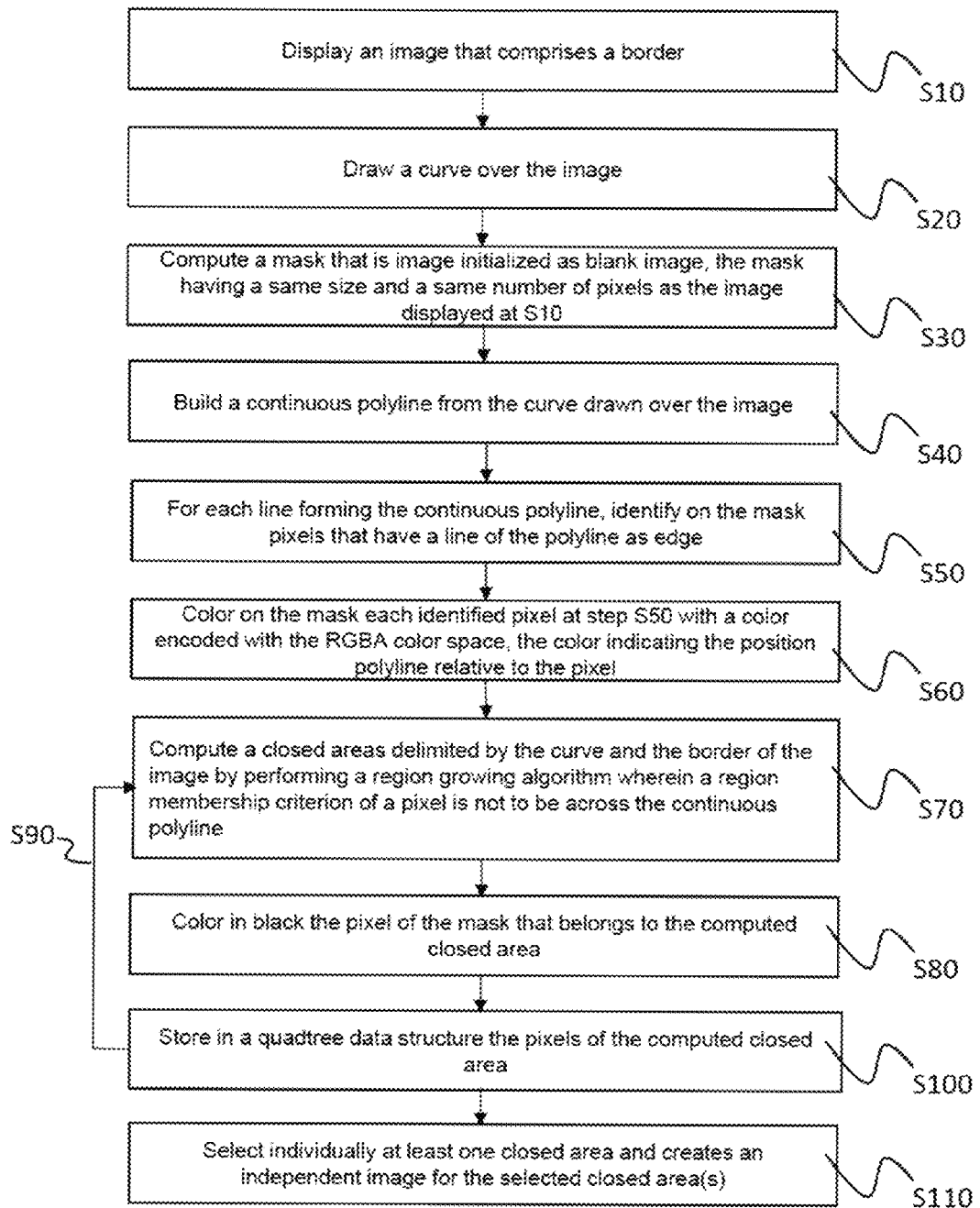
FIG. 7 is a flowchart illustrating an example of the present invention.

With reference to the flowchart of FIG. 7, it is proposed a computer-implemented method for partitioning an image. Partitioning an image means that the image is divided into at least two parts that are separable. The method comprises a step of displaying an image that comprises a border. Then, a curve is drawn over the image that is displayed. Then, all closed areas delimited by the curve and the border of the image are computed. Each computed closed area is independent from the other computed closed areas and is individually selectable.

The method of the present invention provides a more efficient partitioning of an image. Indeed, the number of closed areas (that is, the number of subparts) is computed only from the curve drawn by the user and the border of the image, and it does not require the linking between the start point and the end point of the curve. Interestingly, the border of the image is used when computing the number of closed areas. This way, if the user wants to cut an image in half, he just needs to draw a line from the top to the bottom of the image. As the border of the image are used when computing the number of closed area, there is at least one closed area—the complete image when the curve drawn by the user does not comprises an intersection—to several ones, depending on the number of closed shape in his drawing. Thus, user's intention is not altered while less computing resources are required for computing the closed area as there is no "inside" "outside" determinations. Further advantages will be discussed in the description.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the step of drawing a curve over the image (S20) is triggered upon user action. The step of selecting individually at least one closed area (S110) can also be performed upon user action.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method generally manipulates images. An image may be two-dimensional. An image may be tri-dimensional, e.g. a representation of a three-dimensional modeled object shown in a three-dimensional scene in a Computer-Aided Design (CAD) system. In the present invention, the term image refers to digital image that is a numeric representation of the image. Numeric representation involves that data of image are represented in sets of binary digits, as known in the art. An image can be, but is not limited to, a raster image or vector image. A raster image is stored as a finite set of picture elements (pixels), each pixel representing a digital value. A vector image is stored as a set of geometrical primitives that are based on mathematical expressions to represent the image.

When displayed, the raster image and the vector image are represented as a set of pixels. To this aim, a vector image is converted into a raster image before to be displayed; this is called rasterization. Pixels are the smallest individual elements in an image. A pixel holds quantized values that represent the brightness of a given color in a color system at one specific point of the image. In practice, an image is displayed by an image viewer software executed by a computer system. The image viewer software can implement the method of the present invention, or the method can be implemented in an independent computer program.

The set of pixels of a raster image or a vector image or any other type of image represented with pixels generally form a rectangular grid of pixels wherein each pixel is also rectangular. Each pixel is connected with neighbouring pixels. Pixel connectivity is the way in which pixels in two- or three-dimensional images relate to their neighbours, as known in the art. For instance, if pixels of the image are rectangles, each pixel has four edges and shares one or more edges with a neighbouring pixel.

The grid of pixel is not limited to a rectangular grid and may be a hexagonal grid or a stretcher bond rectangular grid wherein a pixel may have up to six neighbouring pixels, as known in the art. In the following of the description, the most frequent case of an image represented with a rectangular grid of rectangular pixels will be discussed for the sake of explanation only.

Figure 22:
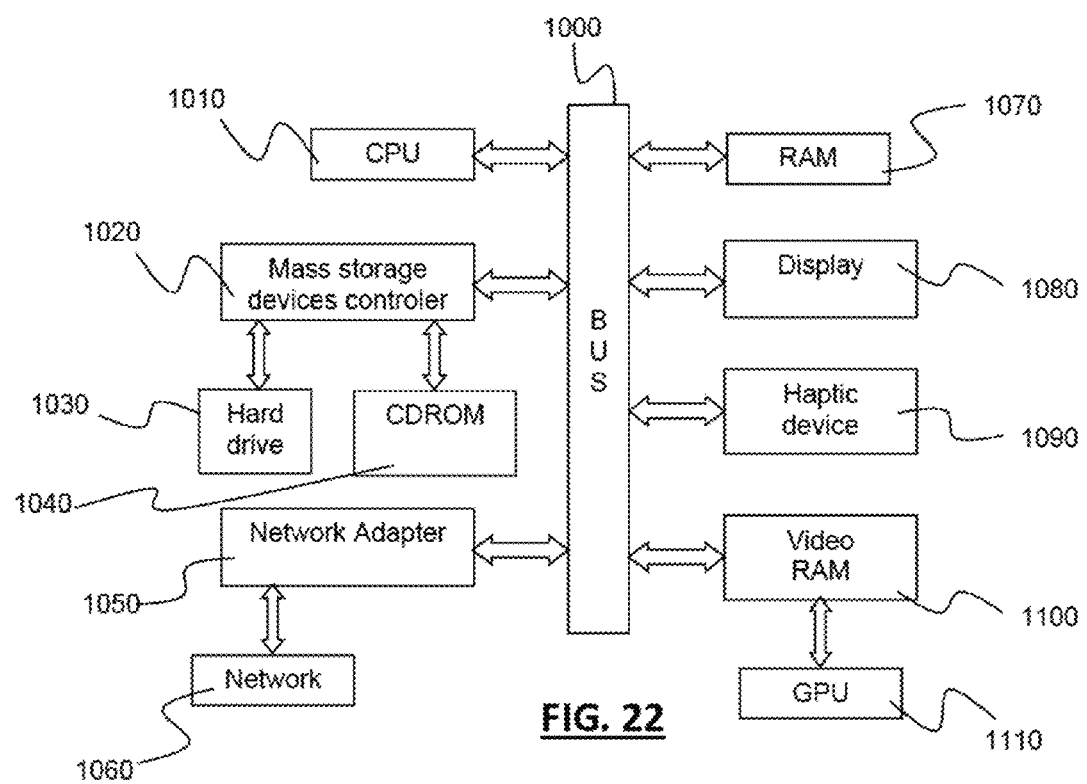
FIG. 22 shows an example of a system for performing the present invention.

FIG. 22 shows an example of a system for performing the method of the invention. The system is typically a computer, e.g. a personal computer. The computer of FIG. 22 comprises a central processing unit (CPU) 1010 connected to an internal communication BUS 1000, a random access memory (RAM) 1070 also connected to the BUS. The computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The computer may also include a haptic device 1090 such as cursor control device, a keyboard or the like. A cursor control device is used in the computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the computer system may comprise a sensitive pad, and/or a sensitive screen.

The present invention can be implemented by a computer program. The computer program comprises instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring back to FIG. 7, at step S10, an image is displayed, e.g. by the system. Displaying an image means that a set of pixels are represented on a display device, e.g. on a display 1080 of FIG. 22. The process of displaying the image is performed as known in the art. The image comprises a border. The border of an image is a set of pixels of the image whose pixel connectivity is partially fulfilled. For instance, a rectangular pixel belongs the border of the image if said pixel has three or less neighboring pixels. The display of the image can be triggered upon user action, e.g. after a user selection of an image.

Next, at step S20, a curve is drawn on the image displayed at step S10, e.g. by the user. The term curve means an object similar to a line segment but which is not required to be straight; the line segment is a part of a line that is bounded by two distinct end points and contains every point on the line between its end points. In the present invention, the term curve is synonymous of the expression free form shape. Alternatively, a predefined shape can be drawn on the image. Any predefined shape can be used.

The drawing of the curve is performed by the user. He proceeds as known in the art. For instance, the user can use a haptic device such as a mouse, a stylus on a touch sensitive display.

The expression drawing a curve on the image involves that the user interacts with a representation of the image (for instance with a computer screen on which the image is represented), and that the image is not modified (e.g. the pixels of the image are not colored). The representation of the curve that is shown to the user is temporary and is superimposed on the representation of the image. Hence, one could also say that the curve is drawn over the image.

Figure 10:
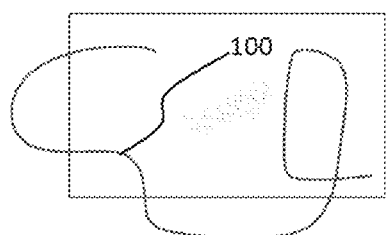
FIG. 10 shows a curve drawn by a user over an image.

Referring now to FIG. 10, it is shown a curve that has been drawn by the user: a representation 100 of the curve drawn by the user is superimposed on the image that is not modified. The border of the image is represented by black plain lines. Interestingly, one can notice that some parts of the curve are outside the image. This is possible because the user has drawn the curve on the computer screen and not directly on the image. Alternatively, the image may be laid on an image canvas (not shown) that is larger than the image. The user can draw (totally or partially) the curve out the image; the drawing of the curve is not limited by the boundary of the image.

Then, at step S30, a mask is computed, e.g. by the system. The mask is typically computed when the user stops drawing the curve. The mask is an image with the same size and the same number of pixels as the displayed image. For instance, if the image displayed at step S10 has a size of (x×y) pixels and comprises n=x×y pixels, then the mask is computed so that it has the same size of (x×y) pixels and same number n of pixels. Said otherwise the mask has the same size and resolution as the image displayed at step S10.

There is one correspondence between one pixel of the mask and one pixel of the image, so that the result of operation(s) performed on one pixel of the mask can be carried over one corresponding pixel of the image.

In practice, the mask is initialized as a blank image and the value of opacity of its pixels is the same for each pixel, e.g. in the RGBA (Red Green Blue Alpha) color space. This allows to set up evenly the color channels of each pixel of the mask. The mask is preferably initialized as transparent. It is to be understood that the mask is not displayed to the user and should be seen as an internal structure used by the present method when executed. Being not displayed, the user does not interact directly on the mask.

Then, at step S40 of FIG. 7, a continuous polyline is built from the curve drawn on the image, e.g. by the system. The continuous polyline is composed of one or more line segments (also referred to as lines) wherein the endpoints of each segment are specified. The polyline is continuous as each point of the polyline is connected to two segments, except for the two distinct end points that are connected to one point. Building the continuous polyline means that a pixel position of each point of the curve drawn is computed.

Figure 14:
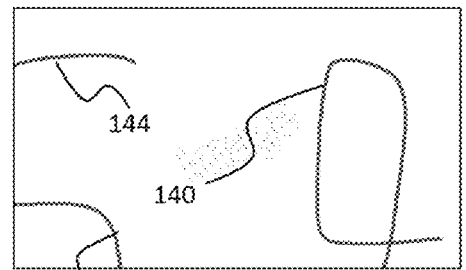
FIGS. 14, 15, 16, 17, 18, 19, 20, 21 and 21 show the computing of closed areas, in accordance with the present invention.

In the event part(s) of the curve had been drawn outside the image as illustrated on FIG. 10, these part(s) are not taking it into account. This is shown on FIG. 14 wherein three continuous polylines 140, 142, 144 have been built from the curve of FIG. 10. The parts of the curve outside the image (that is, not over the image) have been ignored so that the system has considered that three independent curves have been drawn over the image; on FIG. 14 one continuous polyline 140, 142, 144 has been computed for each independent curve. In fact, the ignored parts of the curve are (i) located outside the image and (ii) they extend from a first intersection between the curve and the border of the image to a second intersection between the curve and the border of the image. Said otherwise, the parts of a curve (drawn inside and outside the image) that are retained are (i) inside the image and (ii) they extend (a) from a first intersection between the curve and the border of the image to a second intersection between the curve and the border of the image, or (b) from a first intersection between the curve and the border of the image to an end point of the curve inside the image. For instance, the continuous polyline 142 built at step S40 has its two endpoints on the border of the image; the continuous polylines 140 and 142 have only one end point on the border and the second end point is located inside the image. It is to be understood that if the curve is totally drawn over the image, the complete curve is retained.

Pixel positions of the curve drawn on the image may be computed as known in the art. In the embodiment depicted on FIGS. 8-9, a derivation of the algorithm of Bresenham, which is a widely known in the art, is used for linking all these pixels positions and for obtaining a continuous line of pixels.

Figure 11:
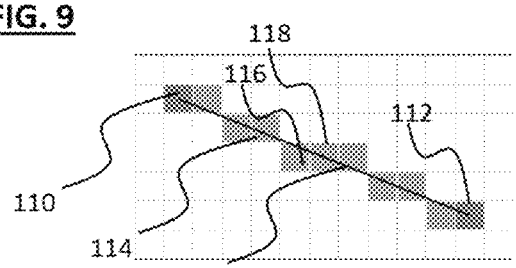
FIGS. 11, 12, and 13 illustrate an example of computing of a polyline from a curve, in accordance with the present invention.

The algorithm of Bresenham computes the shortest path to link two separated pixels. This is illustrated on FIG. 11 wherein the grey pixels are the pixels obtained by using Bresenham's algorithm to link the two pixels 110, 112 representing the positions of the two distinct end points of a curve 113 drawn on an image. One can notice in the original Bresenham's algorithm that there are neighboring pixels 114, 116 sharing only a vertex, while other neighboring pixels 116, 118 share at least one edge with other pixel.

Figure 12:
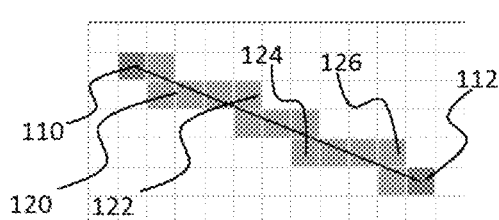

Referring now to FIG. 12, it is shown a derivation of the Bresenham's algorithm: in set of pixels linking the two pixels 110, 112 representing the distinct endpoints, each pixel shares at least one common edge with a pixel among the pixels identified by the original Bresenham's algorithm. Said otherwise, the sole pixel connectivity allowed between neighboring pixels is an edge connectivity. In practice, the result shown in FIG. 12 is obtained by identifying the pixels 120, 122, 124, 126, not selected by the original Bresenham's algorithm, (i) that share a common edge with the two pixels sharing only a vertex, and (ii) on which the curve drawn is located.

Figure 13:
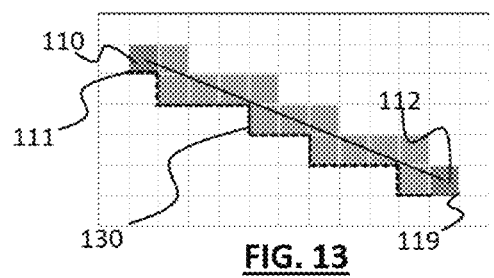

Referring now to FIG. 13, a continuous polyline 130 (represented with dotted lines) can be computed from the continuous edges of the pixels, wherein each edge is a line of the polyline. The continuous edges are found among (i) the set of pixels linking two distinct end points of the curve and obtained with the original Bresenham's algorithm, and/or (ii) the new pixels added for ensuring that there is only an edge connectivity between two neighboring pixels. In FIG. 13, edges of the pixels forming the continuous polyline are selected so that the polyline links the reference points of all pixels. A reference point is one of the four vertices of a pixel. The choice of a reference point for a pixel is arbitrary; in this example, the left-bottom vertex of the pixel is selected as reference point. Any vertex can be chosen as reference point while all the pixels are compliant with this choice. In FIG. 13, each pixel has its own left-bottom vertex as reference point, so that the polyline 130 starts from the vertex 111 of the pixel 110 and stops to the vertex 119 of the pixel 112.

Figure 16:
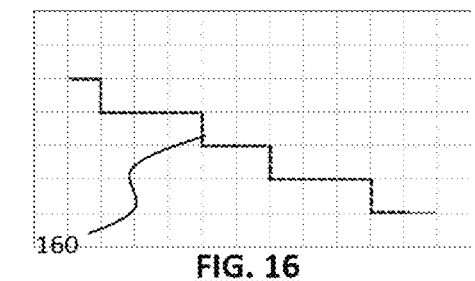

The computing of the polyline is in general performed on the mask computed at step S30. This avoid modifying the image and thus reduces consumption of computing resources. FIG. 16 illustrates the polyline 160 obtained from the curve 113 of FIG. 11.

Figure 1:
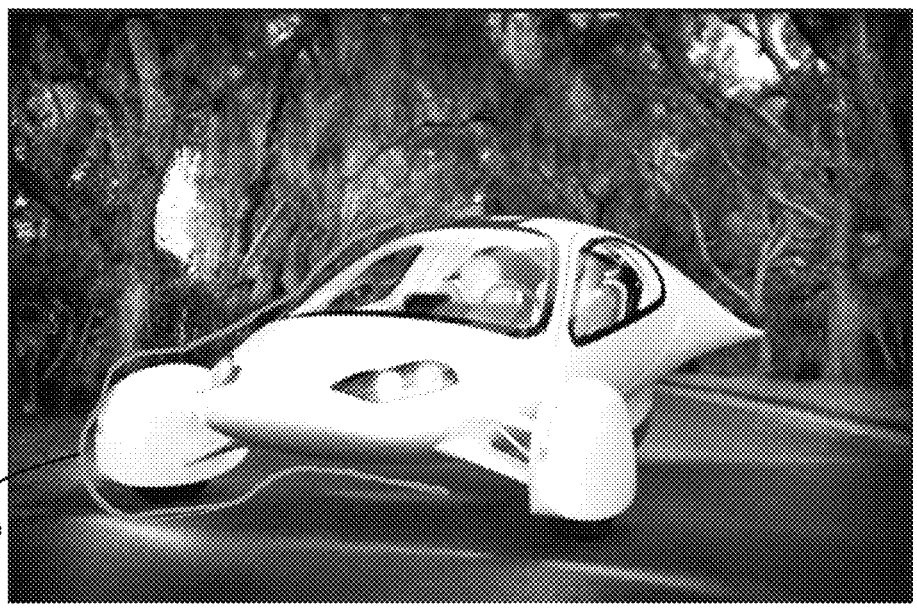
FIGS. 1, 2, 3, 4, 5 and 6 show examples of known methods for partitioning an image.
Figure 2:
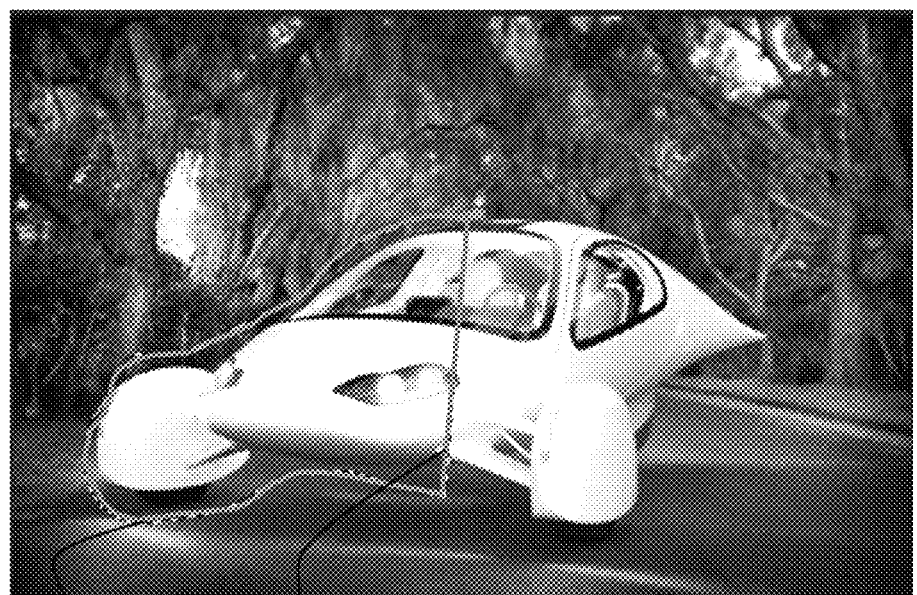
Figure 3:
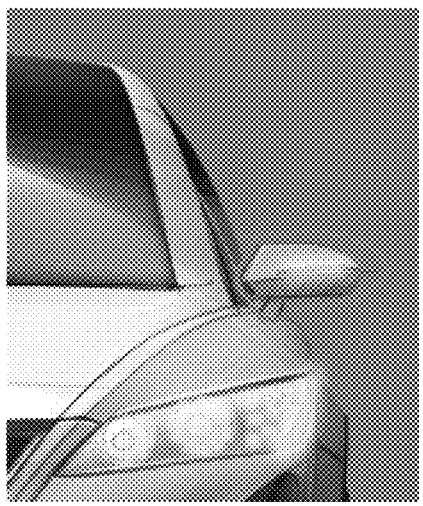
Figure 4:
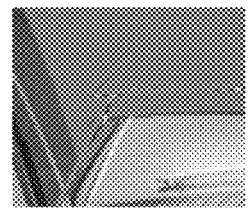
Figure 5:
Figure 6:
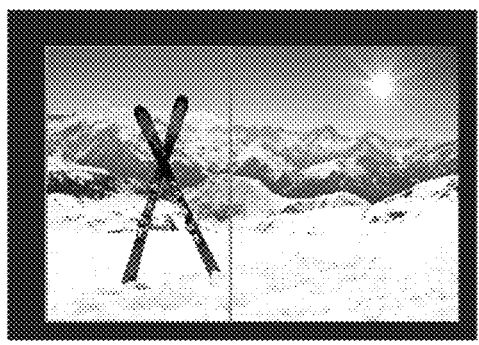
Figure 15:
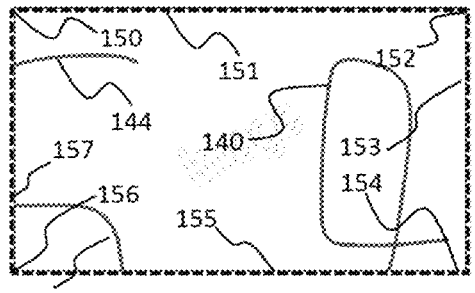

The step building a continuous polyline can further comprises building a polyline for the border of the image. In practice, the image forms a rectangular grid of pixels, and the border of the image is thus a rectangle. In such a case, each one of the four sides of the image is a polyline. The building of a polyline for a side of the image uses information relative to the image: one computes coordinates of each vertex of the image, and then one links the vertices with a segment. This is shown in FIG. 15 that is identical to FIG. 14, except that four polylines 151, 153, 155, 157 of the border of the image, that respectively connect the vertices 150-152, 152-154, 154-156, 156-150, are now represented by dotted lines. Building a polyline for the border of the image advantageously facilitates the creation by the user of closed areas as the border of the image is now considered as a boundary. For instance, if the user wants to cut the image in half, he just needs to draw a line from the top to the bottom of the image, and he chooses if he wants to keep the left or right or both parts of the image. Hence, the user does not need any more to circle around the image if he want to simply cut an image in half, as discussed previously in reference to FIGS. 5 and 6.

Figure 8:
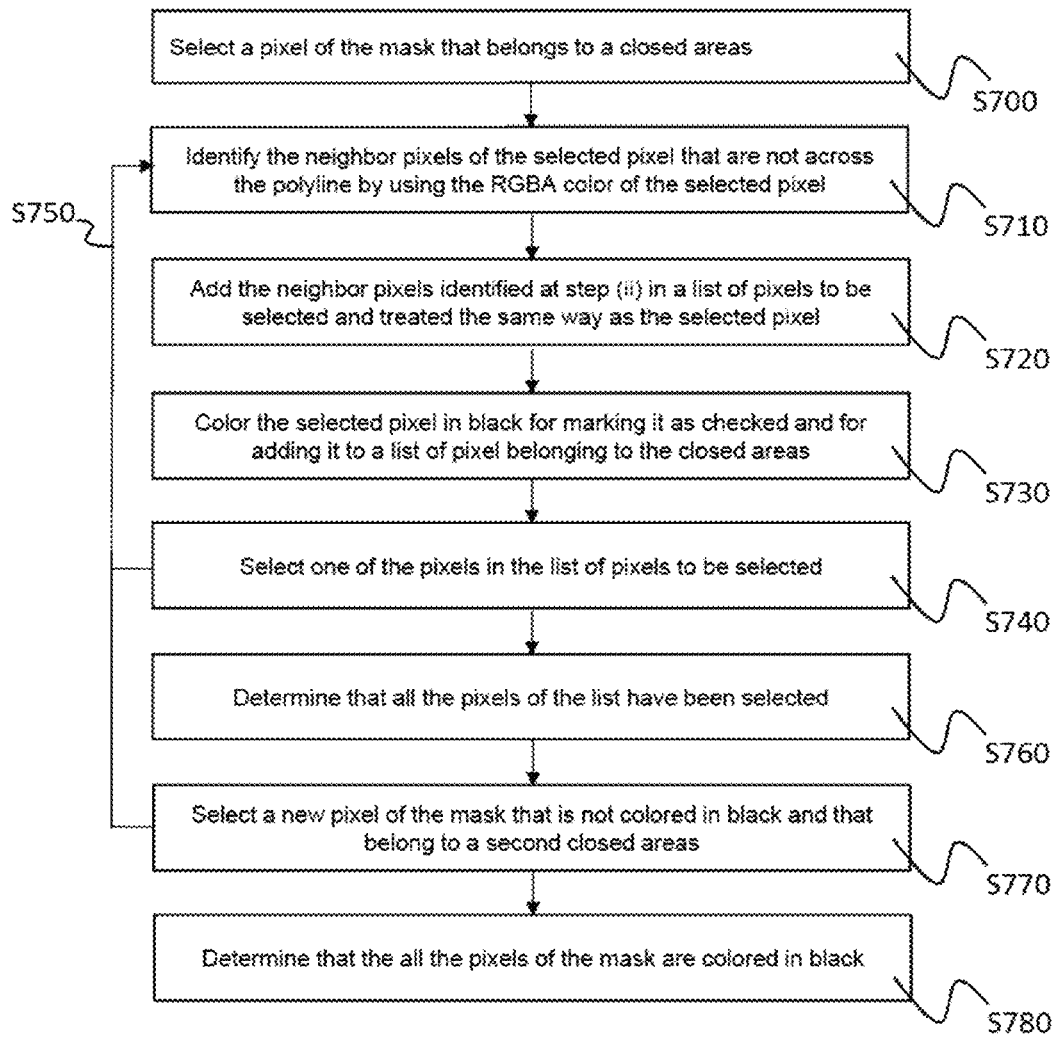
FIG. 8 is a flowchart illustrating an example of a propagation algorithm used in the present invention.
Figure 17:
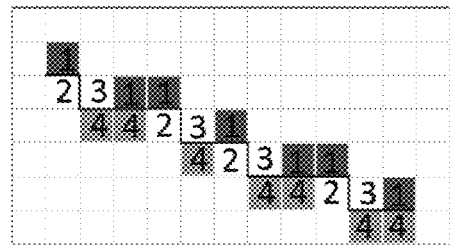

Then, at step S50 of FIG. 8, are identified all the pixels of the image whose at least one edge is one of the lines of the computed continuous polyline. It is to be understood that if the continuous polyline has been built on the mask from the curve drawn, one identifies pixels of the mask. FIG. 17 shows the polyline of FIG. 16 and the identified pixels. This step creates a border of the polyline made of two pixels situated on both sides of the polyline, and this two pixels border makes easier the identification of the pixels that belong to a closed area; the computation of the closed areas is made easier and ensures that the pixels in contact with the polyline are assigned in the correct closed area.

Then, at step S60, each pixel that was identified at step S50 is now marked for indicating the position of the polyline computed at step S40 relative to it. It is to be understood that the opposite operation could be made, that is, determining for each pixel its position relative to the polyline. Marking a pixel means that information is added to the pixel: the additional information may be stored with the pixel data, or it may be stored in a new data structure. Preferably, the marking is stored with pixel data; this provides best computational results for the system that executes the present method.

The position of the polyline relative to a pixel is inferred with the reference point of the pixel. If the left-bottom vertex of the pixel is selected as reference point and has the coordinates (a, b) in the image referential (typically, the origin of the image referential is the left-bottom vertex of the pixel located on the left-bottom of the image), the other vertices have the coordinate (a+1, b), (a, b+1), (a+1, b+1). By this way, each edge is defined by a couple of coordinates that is associated with a position, namely right edge, or left edge, or up edge, or bottom edge of the pixel. The determination of the position of the polyline relative to a pixel is then straight forward: (i) if the line of the polyline is the right edge of the pixel, then the polyline is on the right side of the pixel; (ii) if the line of the polyline is the left edge of the pixel, then the polyline is on the left side of the pixel; (iii) if the line of the polyline is the top edge of the pixel, then the polyline is on the top side of the pixel; (iv) if the line of the polyline is the bottom edge of the pixel, then the polyline is on the bottom side of the pixel.

In the embodiment depicted on FIGS. 7 and 8, the marking is performed by using the RGBA channels of the mask for encoding information. Said otherwise, the marking consists in coloring each pixel identified at step S50 according to its position relative to the polyline. Here, the acronym RGBA refers to Red Green Blue Alpha color space wherein each color (Red Green Blue) and the opacity (A) is defined by n bits, e.g. RGBA information of one pixel can provide a single 32-bit unsigned integer for n=8 bits per channel for encoding the position.

Hence, a first RGBA value (for instance transparent green R=0, G=255, B=0, A=0) indicates a polyline positioned on the right side of the pixel; a second RGBA value (for instance transparent white R=0, G=0, B=0, A=255) indicates a polyline positioned on the left side of the pixel; a third RGBA value (for instance transparent red R=255, G=0, B=0, A=0) indicates a polyline positioned on the up side of the pixel; and a fourth RGBA value (for instance transparent blue R=0, G=0, B=255, A=0) indicates a polyline positioned on the bottom side of the pixel. One understands that using a RGBA value amounts to coloring the pixel. Hence, when step S60 is carried out, the mask (initialized as blank image) now comprises colored and transparent pixels indicating the position of the polyline relative to these pixels.

Interestingly, the process of marking the pixels is cumulative. This means that a pixel can be marked several times and that the information of each successive marking can be retrieved. For instance, if the polyline is on the up side and on the right side of a pixel, the pixel will be marked two times, and the last marking (that is, the result of the two markings) will provide information that the polyline is on the up and right sides of the pixel. In this example, if the third RGBA value indicate indicating that a polyline positioned on the up side of the pixel is set R=0, G=255, B=0, A=0 and the first RGBA value indicated a polyline positioned on the right side of the pixel is set R=255, G=0, B=0, A=0, then the marking of the pixel will be set to R=255, G=255, B=0, A=0. The pixel is now colored in transparent yellow.

The identified pixels of FIG. 17 are colored (here the colors are represented by a digit written in each pixel): pixels in blue (represented by the digit 1) indicate a polyline positioned on the bottom side of the pixel, pixels in red (represented by the digit 4) indicate a polyline positioned on the top side of the pixel, pixels in light blue (represented by the digit 3) indicate a polyline positioned on the bottom side and on the left side of the pixel, and pixels in yellow (represented by the digit 2) indicate a polyline positioned on the up side and on the right side of the pixel. Pixels with digits 2 and 3 are thus pixels with a cumulative marking.

Then, at step S70 to S100, all closed areas delimited by the curve and the border of the image are computed. The expression all closed areas involves that one or more closed areas are computed. A closed area is a delimited surface on the image the user wishes to select, the surface being delimited by a continuous polyline built from the curve drawn by the user and/or a continuous polyline build from the border of the image. Each closed area is independent from one other closed area of the image; this means that there is no intersection between two closed areas, that is, a pixel of the image can belong to one closed area only. The one or more closed areas are individually selectable, that is, the selection of one closed area cannot involve the selection of a second closed area. Computing a closed area means that a set of pixels of the image is identified, wherein each pixels of the set has at least one pixel of the set as neighbor.

The computing of all closed areas delimited by the curve and the border of the image can be performed by using a region growing algorithm. Region growing is an image segmentation method wherein a seed point is selected and the region grows from this selected seed point. The region can grow if the neighbor of the selected seed point respect at least one membership criterion, and when a neighbor respect the at least one membership criterion, it is classified as a seed point itself. For each new seed point, the process is repeated until there is no more seed point to check.

FIG. 8 illustrates an example of region growing algorithm that may be used with the present invention. The region membership criterion is that a neighboring pixel of a selected pixel is not across the polyline. Hence, the region membership criterion aims at preserving the neighboring pixels that are not across the polyline(s).

At step S700, a pixel of the mask is selected. The selected pixel belongs to closed area which is not known at this step of the method.

Figure 18:
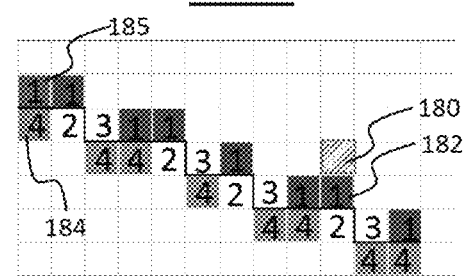

Referring now to FIG. 18, it is shown the polyline and the marked pixels of FIG. 17 that has been slightly modified with the addition of a new line of the polyline and of two pixels 184, 185. One of the pixel 180 has been selected, e.g. a random selection of a pixel is performed by the system running the present partitioning method. Alternatively, the user may select one of the pixel.

Back to FIG. 8, at step S710, neighboring pixels of the selected pixel are checked for identifying which of these neighboring pixels meet the membership criterion: the neighboring pixels of the pixel 180 selected at step S700 that are across a polyline previously built are rejected, that is, they are considered as not belonging to the current closed area wherein pixel selected at step 700 belongs. Said otherwise, one identifies one or more neighboring pixels that are not across a polyline, and thus that belong to the closed area of the selected pixel. It is to be understood that the determination whether or not a neighboring pixel is across the polyline is relative to the selected pixel. The identification of the pixels that met the criterion thus consists in identifying rejected pixels (those across the polyline) or identifying pixels to be kept (those not across the polyline).

The verification of the membership criterion is preferably done by using the marking on the selected pixel. If the selected pixel on the mask is blank, this means that none of its edges is a line of the polyline, and therefore, none of his neighboring pixels is across the polyline (relative to the selected pixel). If the selected pixel on the mask is marked, then the marking indicates the position of the polyline relative to this selected pixel, and the neighboring pixel sharing the edge used as line of the polyline is discarded as it is considered across the polyline.

Then, at step S720, the neighboring pixels previously identified at step S710 are added to a list of pixels that are going to be selected and treated the same way as the current selected pixel. This ensures the correct propagation of the region growing algorithm.

Back to FIG. 18, the pixel connectivity in this example is of four neighboring pixels for each pixel of the image (except for pixel of the border of the image or of the border of the mask). Hence, the selected pixel (the hatched one 180 on FIG. 18) has four neighboring pixels. The hatched pixel is not colored, which means that none of the edges of the pixel 180 comprises a line of a polyline previously built. The pixels identified as pixels to be kept are added to a list of pixels to be selected and treated the same way as the pixel selected at step S700: in this example, the four neighboring pixels of the selected pixel 180 are kept and added to the list as they meet the criterion.

Then, at step S730, the selected pixel is marked as checked. This can be done by using the RGBA channels, e.g. the pixel is colored in black. The marked pixel is then added to a list of pixels that belong to the closed area currently computed.

Next, at step S740, a new pixel is selected from the list created at step S720. This pixel is treated the same way as the pixel selected at step S710. Hence, steps S710 to S740 are performed for this pixel.

Figure 19:
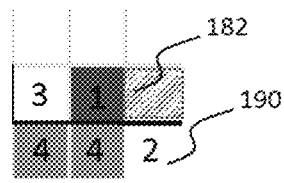

Referring now to FIG. 19, it is now focused on a new selected pixel 182 that is a neighboring pixel of the previously selected pixel 180 shown on FIG. 18. This pixel 182 was added to the list of pixels to be selected and treated the same way as the previously selected pixel 180. The selected pixel 182 is marked in blue, which indicates (i) that a polyline is positioned on the bottom side of this pixel and (ii) that the neighboring pixel 190 (colored in yellow and represented by the digit 2) is across the polyline. Hence, this pixel 190 is rejected and will not be added to the list of pixels to be selected, and therefore, it will be not marked as belonging to the same closed area of the pixel selected at step S700. On the contrary, the two other neighboring pixels will be added to the list of pixels to be selected; one understand that the pixel 180 is not added to the list of pixels to be selected and treated as it is already marked as checked. By this way, the repetition of the steps S710 to S760 can converge to a solution.

Back to FIG. 8, at step S760, one determines that all the pixels in the list of pixels to be selected have been treated indeed. Thus, the steps S710 to S740 have been repeated (S750) while each pixel contained in the list has not been marked as checked (e.g. colored in black).

Figure 20:
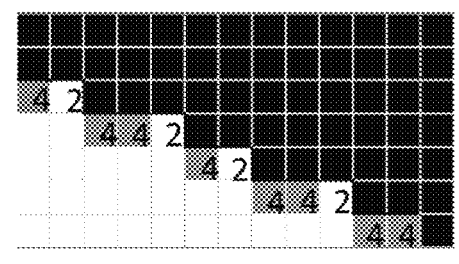

At this step of the process, the mask comprises a set of pixel colored in black that belong to a first closed area of the image. These pixels in colored in black thus belongs to a set of pixels forming the first closed area. This is illustrated on FIG. 20 that shows the polylines and the identified pixels of FIG. 18 wherein all the pixels placed on top of the polyline have been colored in black. Interestingly, the pixels identified at step S50 and placed below the polyline are untouched at this step of the process: the marking on the pixels that is required for similarly computing the second closed area in contact with the polyline has not been altered.

In practice, after that a closed area has been computed, the pixels of this newly computed closed area are stored (S100) in a data structure. This data structure stores, for each pixel of the image, the closed area to which said each pixel belongs. The data structure used can be a quadtree data structure, as known in the art. The quadtree data structure advantageously improves performances when search for a computed closed area Then, a new pixel that belongs to a second closed area is selected on the mask (step S770). This selected pixel is therefore not marked as checked, e.g. not colored in black. It is to be understood that the image can comprises only one closed area, e.g. the curve drawn by the user does not self-intersect or does not intersect the border of the image at least two times, so that only the border of the image creates a closed area.

Then, the steps S710 to S760 are repeated similarly until the second closed area has been computed, that is, all the pixels of the second closed area are colored in black. Then, the pixels of the second closed area are stored in the same quadtree data structure in which the pixel of the first computed closed area are already stored.

While all the pixels of the mask are not marked at step S770, the step S710 to S760 are repeated.

Next, at step S780, one determines that all the pixels of the mask have been colored in black. Hence, all the closed areas have been computed. From now, and for each pixel of the mask, one identifies its corresponding pixel on the image, and pixels of the image are grouped in accordance with the closed areas previously computed.

It is to be understood that this step S780 is implicitly performed when a quadtree data structure is used for storing each newly computed closed area: indeed, the quadtree is filled out with the coordinates of the pixels that belong to the newly discovered closed area.

Figure 21:
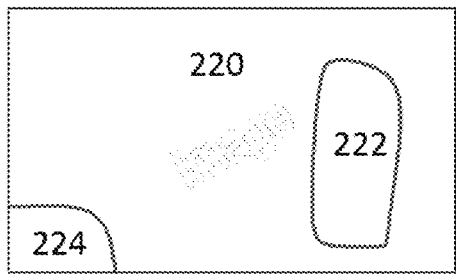

FIG. 21 illustrates the three closed areas 200, 222, 224 computed from the continuous polylines 140, 142, 144, 151, 153, 155, 157 represented on FIG. 15.

Figure 9:
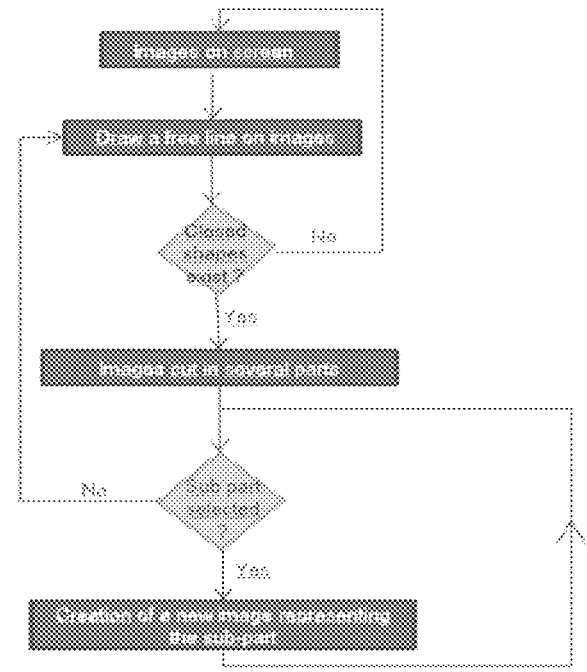
FIG. 9 is a flowchart illustrating operations for creating a new image from an image partitioned in accordance with the present invention.

Referring now to FIG. 9, it is shown an example of the creation of a new image from several initial images partitioned in accordance with the present invention.

Several images are displayed to user who draws a free form on one or more of the displayed images. Equally, the images may be displayed side by side or they may partially or totally overlap. The curve drawn by the user is represented over the displayed images that are not modified.

Then, it is detected the presence of closed shapes that have been computed as described in reference to step S70. The border of the image generates a closed area, which can be taken into account or not. For instance, in the event the curve drawn by the user does not self-intersect or does not intersect the border of the images at least two times, only the borders of the images create one or more closed areas. It can be decided that these closed areas are not shown to the user, or on the contrary are shown to the user.

The closed areas are then shown to the user. This can be performed for instance, but is not limited to, with a specific rendering of each closed area, with a particular rendering of the pixels forming the border of each closed area . . . . At this step, the image is cut. This is performed by using a final mask (that may be stored using a quadtree data structure) that stores, for each pixel of the images, the closed area to which said each pixel belongs.

Then, the user selected one or more closed areas of the image. The selection is performed as known in the art, e.g. the user moves the cursor of a mouse over the closed area(s) to be selected and clicks the mouse to tell the system to select this sub-part of the image.

A new image is created for each of those closed areas, without modifying the initial one. This can be performed with a copy of the pixels of each selected sub-parts into the new image.

Then, the user can stop the process, or he can perform further selections as the initial images are not modified by the present partitioning method.

The preferred embodiment of the present invention has been described. It will be understood that various modifications may be made without departing from the spirit and scope of the invention. Therefore, other implementations are within the scope of the following claims.

The invention claimed is:

1. A computer-implemented method for partitioning an image comprising:
displaying an image that comprises a border;
drawing a curve over the image;
building a continuous polyline from the curve drawn over the image;
for each line forming the continuous polyline, identifying pixels of the displayed image that have the respective line of the continuous polyline as an edge;
computing all closed areas delimited by the polyline and the border of the image and all closed areas delimited by the polyline alone, each closed area being independent from one another and individually selectable by a user; and
displaying one or more of the computed closed areas together with the image on a display.

2. The computer-implemented method of claim 1, wherein the step of building the continuous polyline comprises:
computing a set of pixels linking two distinct end points of the curve drawn over the image, wherein neighboring pixels of the set have an edge in common; and
building the continuous polyline wherein each line of the polyline is an edge of one of the pixels of the computed set of pixels.

3. The computer-implemented method of claim 2, further comprising, after the step of identifying the pixels of the displayed image,
marking each identified pixel, the marking indicating the position of polyline relative to each identified pixel.

4. The computer-implemented method of claim 3, wherein the step of marking each identified pixel is performed by coloring each identified pixel with at least one color encoded with a RGBA color space:
a first RGBA value indicates a polyline positioned on the right side of the pixel;
a second RGBA value indicates a polyline positioned on the left side of the pixel;
a third RGBA value indicates a polyline positioned on the up side of the pixel; and
a fourth RGBA value indicates a polyline positioned on the bottom side of the pixel.

5. The computer-implemented method of claim 4, wherein the coloring of each pixel is cumulative.

6. The computer-implemented method of claim 1, wherein the step of computing all closed areas delimited by the curve and the border of the image is performed by using a region growing algorithm wherein a region membership criterion of a pixel is not to be across the continuous polyline.

7. The computer-implemented method of claim 6, wherein the region growing algorithm comprises the steps of:
(i) selecting a first pixel of the image that belongs to a first closed area;
(ii) identifying neighboring pixels of the selected first pixel that meet the criterion by using a marking on the selected pixel;
(iii) adding each neighboring pixel identified at step (ii) in a list of pixels to be selected and treated as the first selected pixel;
(iv) marking the selected first pixel as checked and adding the selected first pixel to a list of pixel belonging to the first closed areas;
(v) selecting a second pixel in the list of pixels to be selected and performing the steps (ii) to (iv) for the second pixel;
(vi) repeating the step (v) until all the pixels of the list of pixels to be selected have been selected.

8. The computed-implemented method of claim 7, further comprising:
(vii) identifying a third pixel of the image that belongs to a second closed area, the third pixel were not marked at step (iv);
(viii) performing the steps (ii) to (vi);
(ix) repeating the steps (vii) to(viii) until all the pixels of the image are marked as checked.

9. The computer-implemented method of claim 8, wherein the steps performed starting from the step of building a continuous polyline are carried out on a mask, wherein the mask is an image with the same size and the same number of pixels as the displayed image, and wherein the mask is initialized as a blank image and the pixels marked as checked are colored in black when added to a list of pixel belonging to a closed area.

10. The computer-implemented method of claim 1, wherein the steps performed starting from the step of building a continuous polyline are carried out on a mask, wherein the mask is an image with the same size and the same number of pixels as the displayed image.

11. The computer-implemented method of claim 1, wherein the computed closed areas are stored in a quadtree data structure.

12. The computer-implemented method of claim 1, further comprising, after the step of computing all closed areas:
- selecting individually at least one closed area; and
- creating an independent image for each closed area selected.

13. The computer-implemented method of claim 1, wherein the computing further comprises discarding portions of the continuous polyline that are not included in the closed areas.

14. A non-transitory computer readable medium storing a program comprising instructions for performing the method of claim 1.

15. A system comprising a processor coupled to a memory and a graphical user interface, the memory having recorded thereon a program comprising instructions for performing the method of claim 1.

* * * * *